United States Patent [19]

Kurisu

[11] Patent Number: 5,673,410

[45] Date of Patent: Sep. 30, 1997

[54] SYSTEM FOR ALIGNING VARYING WIDTH INSTRUCTIONS IN A COMPUTER

[76] Inventor: Motohiro Kurisu, 911-3-719 Imajuku, Chigasaki City, Kanagawa-ken, Japan

[21] Appl. No.: 368,225

[22] Filed: Jan. 3, 1995

[30] Foreign Application Priority Data

Jan. 6, 1994 [JP] Japan .................................. 6-021771
Jun. 30, 1994 [JP] Japan .................................. 6-181708

[51] Int. Cl.$^6$ ........................................................ G06F 9/30
[52] U.S. Cl. .................................................. 395/386
[58] Field of Search ........................ 364/DIG. 1 MS File, 364/DIG. 2 MS File; 395/375, 800, 376, 380, 381, 384, 386, 390

[56] References Cited

U.S. PATENT DOCUMENTS 5,438,668  8/1995  Coon et al. .............................. 395/375

OTHER PUBLICATIONS

"Intel486™ DX Microprocessor" Intel (Jun. 1991) Order No. 240440-004 p. 165.

*Primary Examiner*—Robert B. Harrell
*Attorney, Agent, or Firm*—Fishman, Dionne, Cantor & Colburn

[57] ABSTRACT

The invention defines a new computer architecture that will simultaneously improve the efficiency of the instruction word, and the speed of program execution. Instruction word efficiency is important to maximizing the use of available program memory space. The architecture described features an instruction memory that is wider than the minimum instruction width and equal to the maximum instruction width. The architecture is comprised of three sections; instruction memory, instruction read shift register, and control logic. The instruction memory width is equal to the maximum instruction width M (bits); where M is a twos multiple of the minimum instruction width K (bits). Instructions of various sizes are loaded into program memory in discrete blocks of size K. Consequently some multi-byte (assuming K=8) instructions are broken up and therefore occupy a portion of two adjacent memory locations. The Instruction Read Shift Register is best described as a shift register of total width M*3–K bits, containing (M*3–K)/K discrete positions each of width K bits. The shift register design provides for the execution of a new instruction every CPU cycle by holding the next instruction upstream in the shift register. The control circuits oversee the addressing of the instruction memory, instruction decode, loading of the read shift register, and shift control. The control circuits must recognize branch instructions and generate instruction memory addresses accordingly. The invention described herein also provides for the use of attribute instructions. Attributes can be linked to any basic instruction; creating a new, composite instruction that is much more powerful than any single member of the basic instruction set. Attributes in this inventioon can specify word widths for ALU manipulation, ROM and RAM address ranges, post increment/decrement operations for indirect addressing, and ALU control without introducing extra read cycles to instruction lookup. Attribute instructions, used in conjunction with the basic instruction set, simplify the definition of the basic set, increase the total number of valid instructions, maximize the efficiency of instruction memory space allocation, and improve throughput.

14 Claims, 15 Drawing Sheets

| PC (HEX) | EXAMPLE OF INSTRUCTION EXECUTION | NUMBER OF BYTES |
|---|---|---|
| 0000 | INST. 1 | 1 BYTE INSTRUCTION |
| 0001 | INST. 2 | 2 BYTES INSTRUCTION |
| 0003 | INST. 3 | 3 BYTES INSTRUCTION |
| 0006 | INST. 4 | 4 BYTES INSTRUCTION |
| 000A | INST. 5 | 2 BYTES INSTRUCTION |
| 000C | INST. 6 (BRANCH TO 102HEX) | 3 BYTES INSTRUCTION |
| 000F | INST. 7 | 1 BYTE INSTRUCTION |
| 0102 | INST. 8 | 1 BYTE INSTRUCTION |
| 0103 | INST. 9 | 3 BYTES INSTRUCTION |
| 0106 | INST. 10 | 2 BYTES INSTRUCTION |

FIG. 7
PRIOR ART

| ADDRESS (HEX) | EXAMPLE OF INSTRUCTION CONFIGURATION BIT31 ... BIT0 | | |
|---|---|---|---|
| 0000 | INST. 3 | INST. 2 | INST. 1 |
| 0004 | INST. 4 | | INST. 3 |
| 0008 | INST. 5 | | INST. 4 |
| 000C | INST. 7 | INST. 6 | |
| 0100 | INST. 9 | INST. 8 | UNDEFINED |
| 0104 | INST. 10 | | INST. 9 |

FIG. 8

STATUS PC | INSTRUCTION READ SHIFT REGISTER

| | RX=4 | 5 | 6 | 7 | 8 | 9 | 10 | 11 | 12 | 13 | 14 | RA |
|---|---|---|---|---|---|---|---|---|---|---|---|---|
| | IR0 | IR1 | IR2 | IR3 | IR4 | IR5 | IR6 | IR7 | IR8 | IR9 | IR10 | RA |
| 2) 0000 | X | INST. 1 | INST. 2 | | INST. 3 | X | X | X | X | X | X | +1 |
| 3) 0000 | INST. 1 | INST. 2 | | INST. 3 | | INST. 4 | | X | X | X | | +2 |
| 4) 0001 | | INST. 2 | | INST. 3 | | | INST. 4 | | INST. 5 | | | +3 |
| 5) 0003 | | INST. 3 | | | INST. 4 | | | INST. 5 | | X | X | +2 |
| 6) 0006 | | | INST. 4 | | | INST. 5 | | INST. 6 | | INST. 7 | X | +3 |
| 7) 000A | | INST. 5 | | INST. 6 (102H BRANCH) | | | INST 7 | NEXT INST. | | | X | +0 |
| 8) 000C | | INST. 6 (102H BRANCH) | | | INST 8 | INST 9 | | X | | | | +1 |
| 9) 0102 | INST 8 | | INST. 9 | | | INST. 10 | | X | | | | +2 |

FIG. 9

| ST. | PC | INIT1 | INIT2 | MX | RX | S0-S9 | POS | INC | DEC | RA | BR | BS | IS |
|---|---|---|---|---|---|---|---|---|---|---|---|---|---|
| 1 | 0000 | 1 | 0 | X | 5 | 1FFH | X | 1 | 0 | 0 | 0 | 0 | X |
| 2 | 0000 | 0 | 1 | 0 | 8 | 03FH | 5 | 1 | 0 | 1 | 0 | 0 | X |
| 3 | 0000 | 0 | 0 | 0 | 11 | 007H | 8 | 1 | 0 | 2 | 0 | 1 | 0 |
| 4 | 0001 | 0 | 0 | 1 | 13 | 000H | 11 | 0 | 1 | 3 | 0 | 2 | 1 |
| 5 | 0003 | 0 | 0 | 2 | 10 | 00FH | 13 | 1 | 0 | 2 | 0 | 3 | 2 |
| 6 | 0006 | 0 | 0 | 3 | 10 | 00FH | 10 | 1 | 0 | 3 | 0 | 1 | 3 |
| 7 | 000A | 0 | 0 | 1 | 5 | 07FH | 10 | X | X | 0 | 1 | 2 | 1 |
| 8 | 000C | 0 | 0 | 2 | 6 | 0FFH | 5 | 1 | 0 | 1 | 0 | 0 | 2 |
| 9 | 0102 | 0 | 0 | 0 | 9 | 01FH | 6 | 1 | 0 | 2 | 0 | 2 | 0 |

FIG. 10

| SEL64 | BR | BS[2:0] | RX[3:0] | S0 | S1 | S2 | S3 | S4 | S5 | S6 | S7 | S8 | S9 |
|---|---|---|---|---|---|---|---|---|---|---|---|---|---|
| 0 | 1 | 0 | X | 0 | 1 | 1 | 1 | 1 | 1 | 1 | 1 | 1 | 1 |
| 0 | 1 | 1 | X | 0 | 0 | 1 | 1 | 1 | 1 | 1 | 1 | 1 | 1 |
| 0 | 1 | 2 | X | 0 | 0 | 0 | 1 | 1 | 1 | 1 | 1 | 1 | 1 |
| 0 | 1 | 3 | X | 0 | 0 | 0 | 0 | 1 | 1 | 1 | 1 | 1 | 1 |
| 0 | 0 | X | 4 | 1 | 1 | 1 | 1 | 1 | 1 | 1 | 1 | 1 | 1 |
| 0 | 0 | X | 5 | 0 | 1 | 1 | 1 | 1 | 1 | 1 | 1 | 1 | 1 |
| 0 | 0 | X | 6 | 0 | 0 | 1 | 1 | 1 | 1 | 1 | 1 | 1 | 1 |
| 0 | 0 | X | 7 | 0 | 0 | 0 | 1 | 1 | 1 | 1 | 1 | 1 | 1 |
| 0 | 0 | X | 8 | 0 | 0 | 0 | 0 | 1 | 1 | 1 | 1 | 1 | 1 |
| 0 | 0 | X | 9 | 0 | 0 | 0 | 0 | 0 | 1 | 1 | 1 | 1 | 1 |
| 0 | 0 | X | 10 | 0 | 0 | 0 | 0 | 0 | 0 | 1 | 1 | 1 | 1 |
| 0 | 0 | X | 11 | 0 | 0 | 0 | 0 | 0 | 0 | 0 | 1 | 1 | 1 |
| 0 | 0 | X | 12 ≧ | 0 | 0 | 0 | 0 | 0 | 0 | 0 | 0 | 0 | 0 |
| 1 | 0 | X | X | 1 | 1 | 1 | 1 | 1 | 1 | 1 | 1 | 0 | 0 |

| GS | AR | ENS[0:9] |
|---|---|---|
| 0 | X | 1111 1111 11 |
| 1 | 0-4 | 1111 1111 11 |
| 1 | 5 | 0111 1111 11 |
| 1 | 6 | 0011 1111 11 |
| 1 | 7 | 0001 1111 11 |
| 1 | 8 | 0000 1111 11 |
| 1 | 9 | 0000 0111 11 |
| 1 | 10-14 | 0000 0011 11 |

FIG. 14

| A | B | C | INC | DEC |
|---|---|---|---|---|
| 1 | X | X | 1 | 0 |
| 0 | 0 | X | 0 | 0 |
| 0 | 1 | 0 | 1 | 0 |
| 0 | 1 | 1 | 0 | 1 |

FIG. 15

| INIT1 | INIT2 | A<B | GS |
|---|---|---|---|
| 1 | X | X | 0 |
| X | 1 | X | 0 |
| 0 | 0 | 0 | 0 |
| 0 | 0 | 1 | 1 |

FIG. 16

EXAMPLE OF INSTRUCTION EXECUTION WITH ATTRIBUTE

| PC (HEX) | Instruction | NUMBER OF BYTES |
|---|---|---|
| 0000 | INST. 1 | 1 BYTE INSTRUCTION |
| 0001 | INST. 2 | 2 BYTES INSTRUCTION |
| 0003 | ATTR. 1 | 1 BYTE ATTRIBUTE |
| 0004 | INST. 3 | 4 BYTES INSTRUCTION |
| 0008 | INST. 4 | 2 BYTES INSTRUCTION |
| 000A | ATTR. 2 | 2 BYTES ATTRIBUTE |
| 000C | INST. 5 | 3 BYTES INSTRUCTION |
| 000F | INST. 6 | 2 BYTES INSTRUCTION |
| 0011 | INST. 7 | 3 BYTES INSTRUCTION |

FIG. 19

EXAMPLE OF INSTRUCTION CONFIGURATION

| ADDRESS (HEX) | BIT31 ........... BIT0 |
|---|---|
| 0000 | ATTR. 1 \| INST. 2 \| INST. 1 |
| 0004 | INST. 3 |
| 0008 | ATTR. 2 \| INST. 4 |
| 000C | INST. 6 \| INST. 5 |
| 0010 | INST. 7 \| INST. 6 |

FIG. 20

STATUS PC                    INSTRUCTION READ SHIFT REGISTER

| | RX=4 | 5 | 6 | 7 | 8 | 9 | 10 | 11 | 12 | 13 | 14 | RA |
|---|---|---|---|---|---|---|---|---|---|---|---|---|
| | IR0 | IR1 | IR2 | IR3 | IR4 | IR5 | IR6 | IR7 | IR8 | IR9 | IR10 | |
| 2) 0000 | X | INST. 1 | INST. 2 | | ATTR. 1 | X | X | X | X | X | X | +1 |
| 3) 0000 | INST. 1 | INST. 2 | | ATTR. 1 | INST. 3 | | | | X | X | X | +2 |
| 4) 0001 | INST. 2 | | ATTR. 1 | INST. 3 | | | | INST. 4 | | ATTR. 2 | | +3 |
| 5) 0004 | INST. 3 | | | INST. 4 | | ATTR. 2 | | X | X | X | | +2 |
| 6) 0008 | INST. 4 | | ATTR. 2 | | INST. 5 | | INST. 6 | X | X | X | | +2 |
| 7) 000C | INST. 5 | | INST. 6 | | INST. 7 | | | X | X | X | | +2 |

FIG. 21

| ST. | PC | INIT1 | INIT2 | MX | RX | S0-S9 | POS | INC | DEC | RA | BR | BS | IS |
|---|---|---|---|---|---|---|---|---|---|---|---|---|---|
| 1 | 0000 | 1 | 0 | X | 5 | 1FFH | X | 1 | 0 | 0 | 0 | 0 | X |
| 2 | 0000 | 0 | 1 | 0 | 8 | 03FH | 5 | 1 | 0 | 1 | 0 | 0 | X |
| 3 | 0000 | 0 | 0 | 0 | 11 | 007H | 8 | 1 | 0 | 2 | 0 | 2 | 0 |
| 4 | 0001 | 0 | 0 | 2 | 12 | 000H | 11 | 0 | 1 | 3 | 0 | 3 | 2 |
| 5 | 0004 | 0 | 0 | 3 | 8 | 03FH | 12 | 1 | 0 | 2 | 0 | 3 | 3 |
| 6 | 0008 | 0 | 0 | 3 | 8 | 03FH | 8 | 1 | 0 | 2 | 0 | 2 | 3 |
| 7 | 000C | 0 | 0 | 2 | 9 | 01FH | 8 | X | X | 2 | 0 | 1 | 2 |

FIG. 22

SYSTEM FOR ALIGNING VARYING WIDTH INSTRUCTIONS IN A COMPUTER

BACKGROUND

The invention described herein defines a new computer architecture that provides for the reading and execution of a full instruction in a single CPU cycle regardless of the instruction width. Instructions of any size can be read from the program memory in one CPU cycle, including branch instructions.

Conventional CISC architectures (8-bit, 16-bit, etc.) have generally been designed with equally sized data and instruction words. However, in an 8-bit machine, it is not unusual to find instructions that are 2, 3, or even 4 bytes wide. If the program memory is only 8 bits wide, then it can take up to 4 CPU cycles to read a single 4-byte instruction. The efficiency of instruction word bit usage is good in a CISC computer because the instruction size varies with the complexity of the instruction. However, instruction throughput suffers when multiple instruction memory read cycles are necessary to look up a single instruction.

A conventional RISC architecture solves the throughput problem by reducing the size of the instruction set and defining a single instruction width for every instruction. The program memory width is exactly equal to this width. The RISC approach allows for reading one instruction every CPU cycle, but there are many instances where the full instruction word width is not needed to define the instruction. The simplest low level instructions in a RISC computer do not use all of the available bits in the instruction word, which creates inefficiencies in the use of program memory storage space.

Conventional RISC and CISC designs are unable to improve both the instruction word efficiency and throughput at the same time. This invention combines the best features of RISC and CISC into a new architecture that simultaneously improves throughput and efficiency.

When the architecture is expanded to 32 bits, it is still required to process smaller data word sizes such as 8, or 16-bit. Likewise, when the total addressing range is expanded to 32 bits it is still sometimes necessary to work within a small range of 256 or 64K addresses. For example, if a 32-bit CPU is manipulating 8-bit data it is a tremendous waste of instruction memory and CPU cycles to fill in, and process, full 32-bit instruction and data words. Thus, an efficient CPU instruction set tends to be complex to accomodate instructions of varying complexity.

SUMMARY OF THE INVENTION

The invention describes a new computer architecture that improves the instruction word efficiency and throughput simultaneously using an innovative read circuit, a wider instruction memory, and the associated control logic. The efficiency of the instruction word is improved by defining the basic word size as small as possible. More complex instructions are created by stringing one or more basic sized blocks together to form a word that is a multiple of the basic size. The instruction memory width is equal to the largest possible instruction width allowing reads of any size instruction in a single cycle. There are three major functional blocks to the invention; Instruction Memory, Instruction Read Circuit, and Instruction Read Control logic.

In addition, attribute instructions are defined separately from the basic instruction set to control generic functions that can be applied to any instruction in the basic set. For example, attribute instructions such as post increment/decrement, access range of RAM and ROM, and data word manipulation width can be linked with any basic instruction to form a new composite instruction. The decode logic determines for each basic instruction whether or not to attach an attribute. An attribute can be linked to any basic instruction without adding a single CPU cycle to the lookup or execution phases. As long as the sum of the basic instruction width and the attribute instruction width is less than or equal to the maximum instruction memory width, the composite instruction will excute in a single cycle. In the case where no attribute instruction is specified, a default register supplies the necessary inputs to the CPU logic.

Instruction Memory

The instruction memory width is equal to the maximum instruction size. For example, in an 8-bit computer that executes 1, 2, 3, or 4-byte instructions, the program memory width would be 32 bits (4 bytes). The instruction memory width (M bits) is equal to the maximum instruction size and must also be a twos multiple of the minimum instruction size (K bits). Instructions of various widths are loaded byte-wise into program memory. As a result, some multiple-byte instructions may be broken up and reside in adjacent memory locations.

Instruction Read Circuit

The instruction read circuit is actually a large "byte-oriented" shift register. The minimum shift register width (in bits) is $M*3-K$. In the example presented herein, the total shift register is 88 bits wide, or 11-bytes. It is easiest to think of the read shift register as an 11 position byte-wise shift register. In other words, there are 11 discrete byte positions available in the shift register, where each position is 8 bits wide. When the read circuit is operating, entire bytes are shifted from position to position as needed.

Instruction Read Control

The instruction read control circuit controls the reading of instructions from program memory and loading into the shift register. In addition, it controls the shift control, pre-decoding of next instructions to determine whether a branch is necessary, and loading of the branch instruction into the shift register.

BRIEF DESCRIPTION OF THE DRAWINGS

FIG. 7 illustrates the standard Instruction Memory configuration found in a conventional computer with variable sized instruction words.

FIG. 8 illustrates the Instruction Memory configuration employed by this invention for the same program listing given in FIG. 7.

FIG. 9 shows the status of the instruction registers in FIGS. 3–5 when the instructions in FIG. 9 are executed.

FIG. 10 describes the internal signal status of the shift register control circuits illustrated in FIG. 6 when the instructions shown in FIG. 9 are executed.

FIG. 14 is a truth table for the shift enable control circuit #615.

FIG. 15 is a truth table for control circuit #608.

FIG. 16 is a truth table for control circuit #617.

FIG. 19 illustrates the Instruction Memory configuration used to store attribute and basic instructions.

FIG. 20 illustrates the instruction memory configuration employed by this invention for the program listing given in FIG. 19.

FIG. 21 shows the status of the instruction registers in FIG. 3–5 when the instructions in FIG. 19 are executed.

FIG. 22 describes the internal signal status of the shift register control circuits illustrated in FIG. 6 when the instructions shown in FIG. 19 are executed.

DETAILED DESCRIPTION OF THE INVENTION

The following section describes the operation of the invention. All figures and discussion contained herein refer to the sample program listing given in FIGS. 7 and 8. FIG. 7 is an example of a typical computer program consisting of instructions of various widths. In this example, the minimum instruction size is 8 bits and the maximum size is 32 bits. FIG. 7 shows the typical program memory configuration used by a standard CISC computer where each instruction is one of four possible word sizes. In order to demonstrate branching operations, Instruction 6 in this example is a GOTO instruction that branches to Instruction 8.

FIG. 8 shows the actual implementation of the example program using the invention. The instruction memory is 32 bits wide since the maximum instruction word size is 32 bits. The instructions are loaded into program memory one after another in a byte-wise manner. Consequently, Instruction 3 is broken into two pieces; the first byte resides in location 0000H and the remaining two bytes reside in 0004H. Breaking up Instruction 3 in this fashion allows the most efficient loading into the program memory. No memory space is wasted, yet the instruction word size is free to vary in proportion to the complexity of the instruction.

Figure 1:
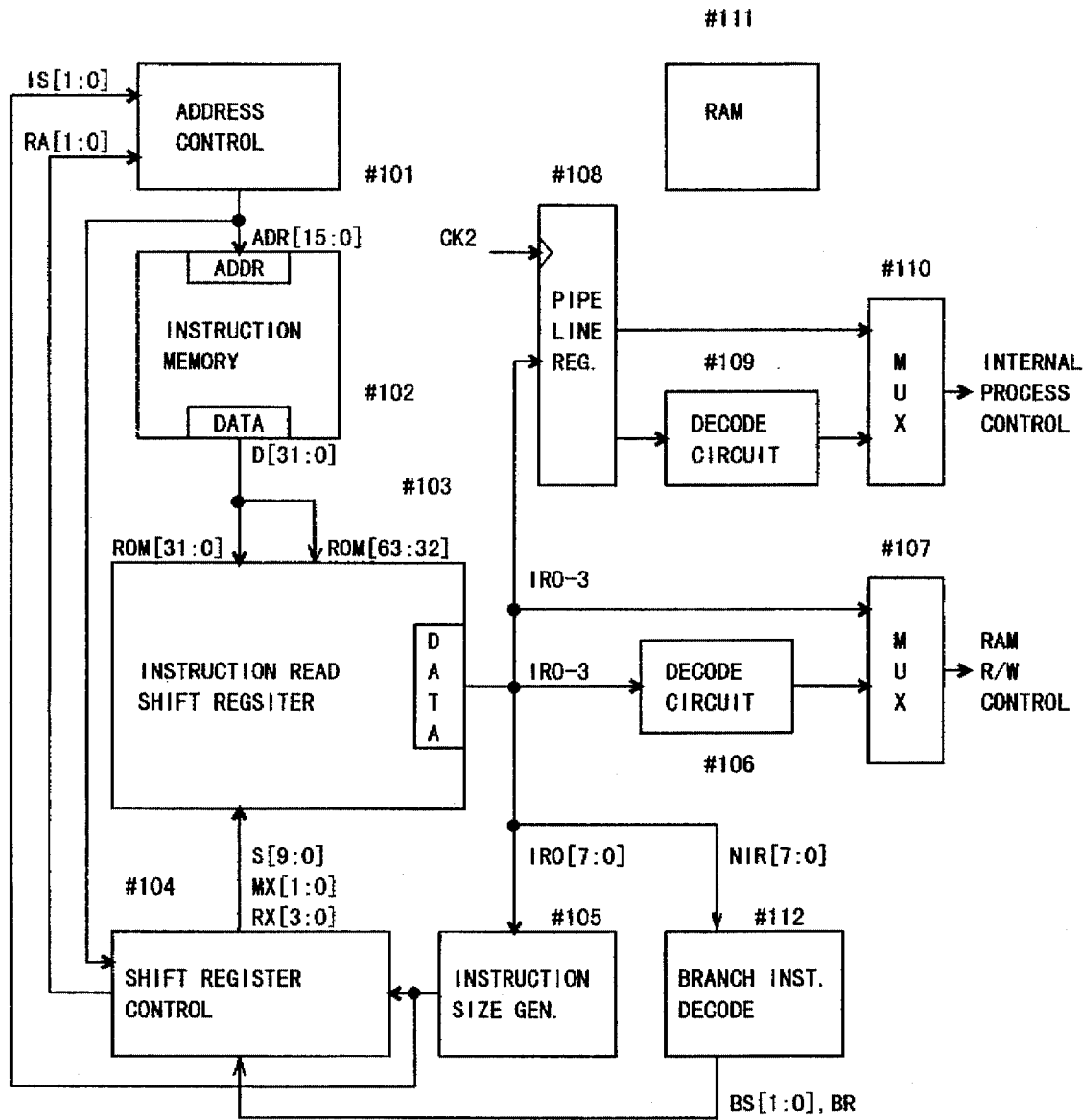
FIG. 1 is a top level block diagram of the invention.

FIG. 1 is the top level block diagram for this invention. The Instruction Memory described in FIG. 8 is shown in block #102. Instruction Memory addresses are supplied by the Address Control block #101. The Address Control logic uses instruction size information (IS[1:0]) to compute the next address. The Instruction Memory (#102) discards the two least significant bits of the address and transfers a full 32 bits of data (D[31:0]) to the Instruction Read Shift Register (#103). Two copies of the instruction data D[31:0] are loaded into the Instruction Read Shift Register in parallel. This data is labeled ROM[31:0] and ROM [63:32] in FIG. 1.

Once an Instruction Memory location has been loaded into the Read Shift Register, the Shift Register Control (#104) logic determines the amount of shifting required. Program execution takes place out of the lowest four bytes in the Instruction Read Shift Register in IR[3:0]. Subsequent instructions are held upstream in the shift register until they are to be executed. At that time they are shifted down to positions IR[3:0]. An individual instruction byte may be shifted from one to four byte-positions in the register. The shifting of instruction bytes provides for the execution of instructions varying in size from one to four bytes every CPU cycle. The control signals S[9:0], MX[1:0], and RX[1:0] from the Shift Register Control (#104) determine how many positions to shift the contents of the instruction register.

It is assumed that the least significant instruction byte stored in position IR0 holds the instruction size information. The instruction size generator in block #105 examines the contents of IR0 and generates a two bit code (IS[1:0]) corresponding to the current instruction size. The table below gives the state of IS [1:0] corresponding to the different instruction sizes.

| Instruction Size (Bytes) | IS1 | IS0 |
|---|---|---|
| 1 | 0 | 0 |
| 2 | 0 | 1 |
| 3 | 1 | 0 |
| 4 | 1 | 1 |

Instruction registers IR0–IR3 are decoded by the Decode Circuit found in block #106. The Decode Circuit generates low level microcode control signals. Alternatively, IR0–IR3 can supply microcode directly when decoding is not necessary. Multiplexor #107 provides for the selection between the decoded and non-decoded contents of instruction registers IR0–IR3. The outputs of Multiplexer #107 are used to control the Read timing of data RAM #111 and Instruction Memory #102.

Branch instructions are recognized in advance by decoding the next instruction (NIR[7:0]) shown in block #112. When a valid branch instruction is detected the BR signal is set to 1 and the size of the branch instruction is encoded on the BS[1:0] lines. The size (in bytes) of the next instruction is always present on the BS[1:0] lines even when the next instruction is not a branch.

Figure 2:
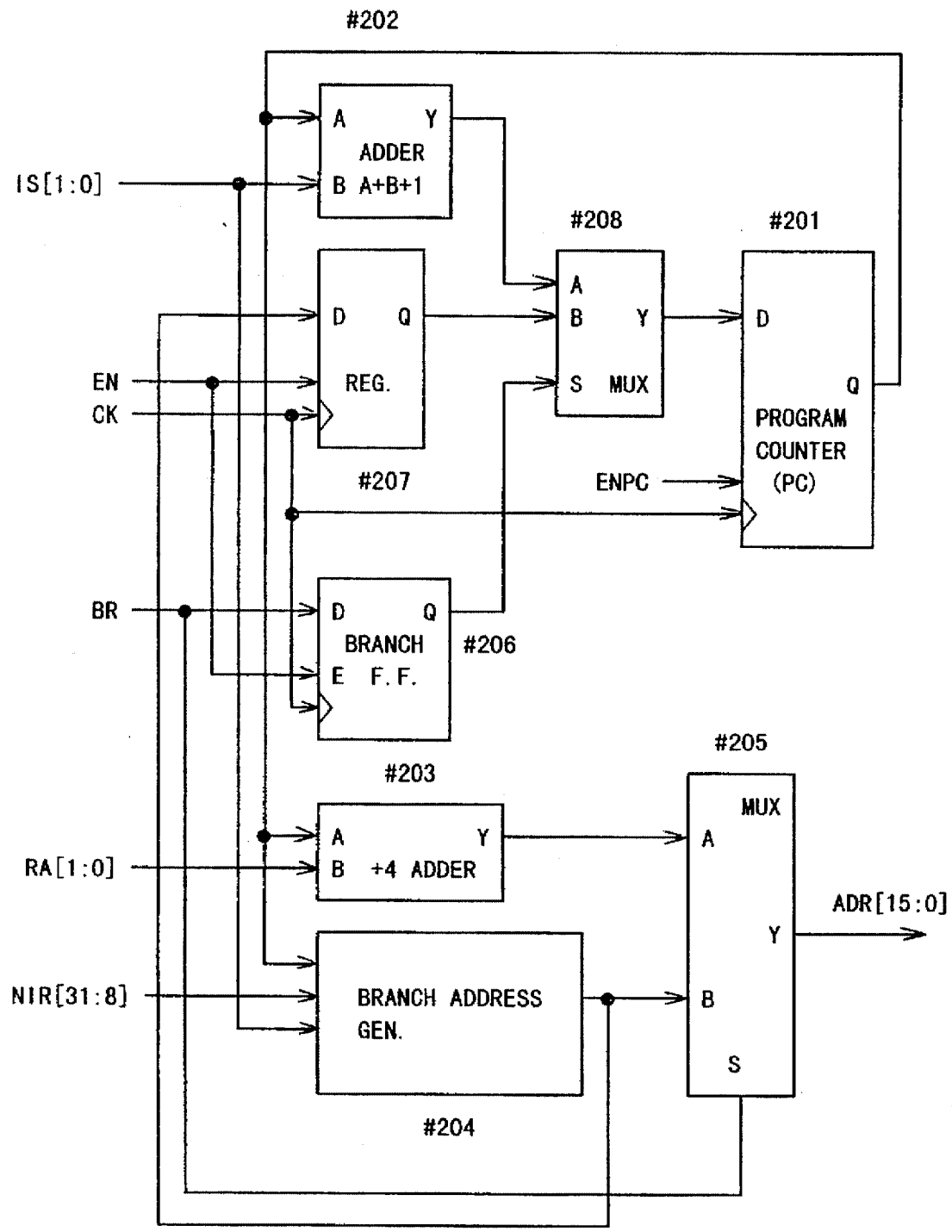
FIG. 2 is a block diagram of the address control circuit, which generates the Instruction Memory address by referencing the program counter and an offset address.

FIG. 2 is a more detailed diagram of the Address Control (FIG. 1 #101) logic. The Program Counter (#201) receives a new value from the Adder (#202) when ENPC=1. The Adder sums the current PC value with the current instruction size IS[1:0]+1, to generate the next instruction memory address. The PC is always loaded in this manner except when a branch instruction is executed.

The +4 Adder (#203) is used to generate the next instruction read address from the current PC and RA[1:0]. The state of RA[1:0] is determined according to the logic shown in FIG. 9. RA[1:0] is initialized to a 0 state and has a maximum value of 3. When more than four byte-positions are empty in the Instruction Read Shift Register, RA is incremented and a new program memory word is loaded into the IRSR. Otherwise RA is decremented and no new program memory word is loaded.

When a valid branch instruction is detected by the Branch Instruction Decode (#112) logic, the Branch Address Generator (#204) constructs the proper branch address. The final Program Memory address is supplied by Multiplexer #205 which selects between the branch and ordinary next addresses. When a branch instruction is executed, the branch address is stored in Register #207 and loaded in the PC through Multiplexer #208.

Figure 3:
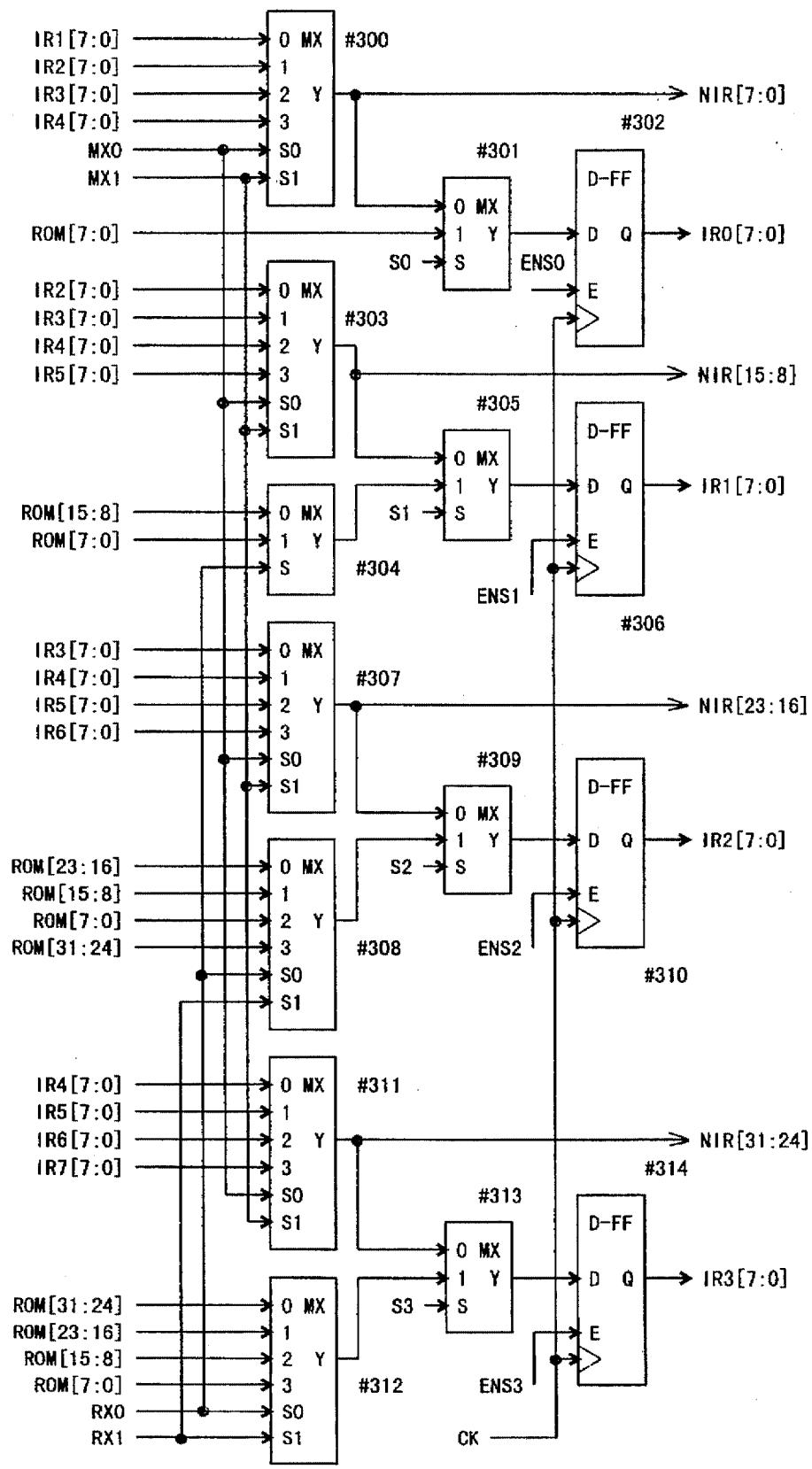
FIGS. 3, 4, and 5 are circuit diagrams of the Instruction Read Shift Register; each contain a.) instruction holding registers, b.) multiplexers for shifting from one byte to four bytes, c.) multiplexers for direct instruction read (no shift), and d.) multiplexers to select between b.) and c.) These circuits hold the current instruction while shifting future instructions into their proper positions.
Figure 4:
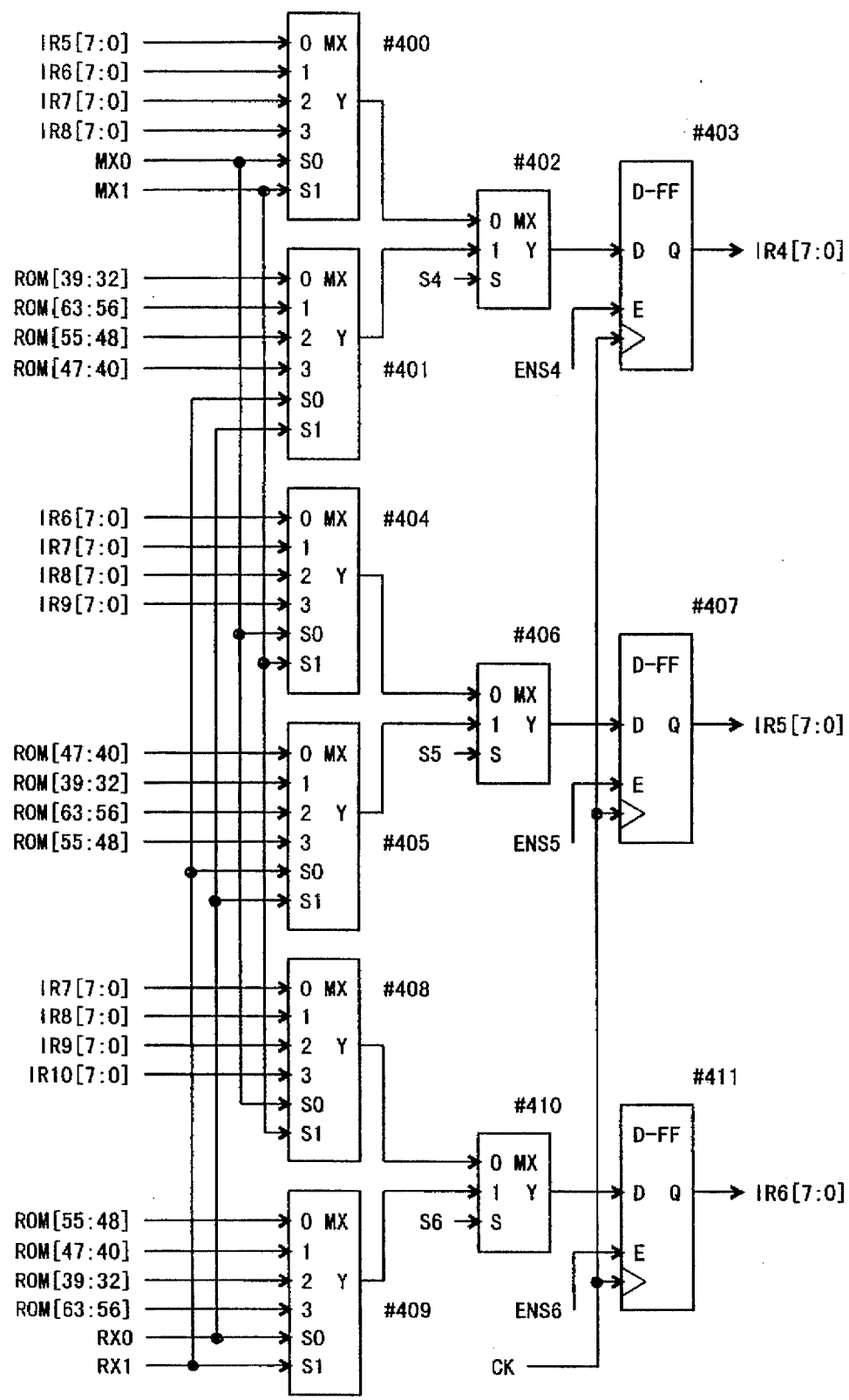
Figure 5:
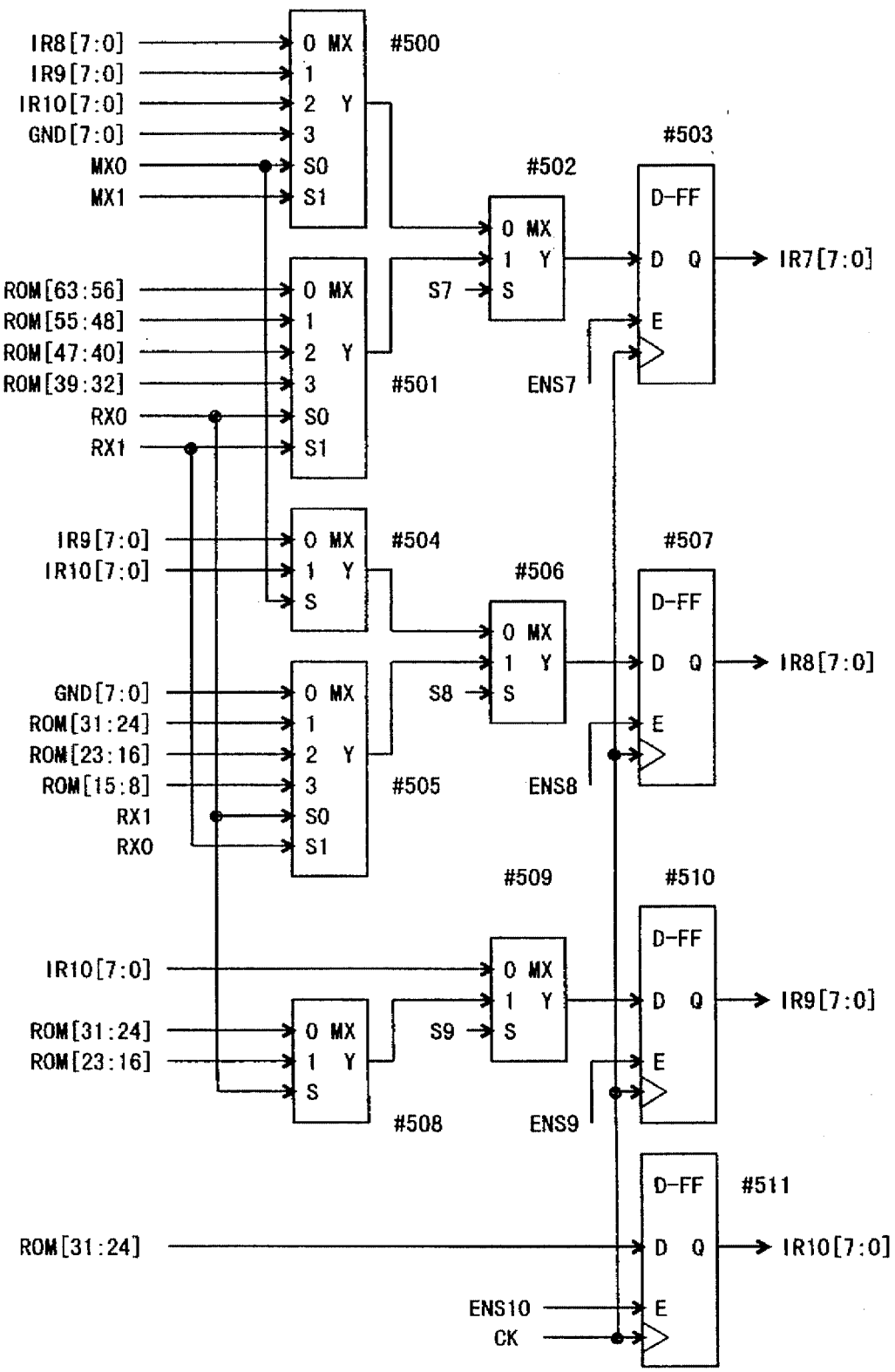

FIGS. 3, 4, & 5 provide a more detailed description of the Instruction Read Shift Register (#103). There are four basic elements to the IRSR; 1) a group of 4:1 multiplexers used to shift instruction bytes from one to four positions in the IRSR, 2) a group of multiplexers that provide the data path for transfering the output of Program Memory into its proper position in the IRSR, 3) a group of 2:1 multiplexers used to select between the output of groups 1 and 2, 4) Instruction Registers (IR[10:0]) which hold the current contents of the IRSR.

The multiplexers in group 1 above are labeled #300, #303, #307, #311, #400, #404, #408, #500, and #504. Group 2 multiplexers are shown in blocks #304, #308, #312, #401, #405, #409, #501, #505, #508. Group 3 multiplexers are shown in blocks #301, #305, #309, #313, #402, #406, #410, #502, #506, and #509. Registers IR3[7:0]–IR0[7:0] shown in blocks #302, #306, #310, and #314 hold the current instruction, while NIR[31:0] is the next instruction to be executed.

Figure 6:
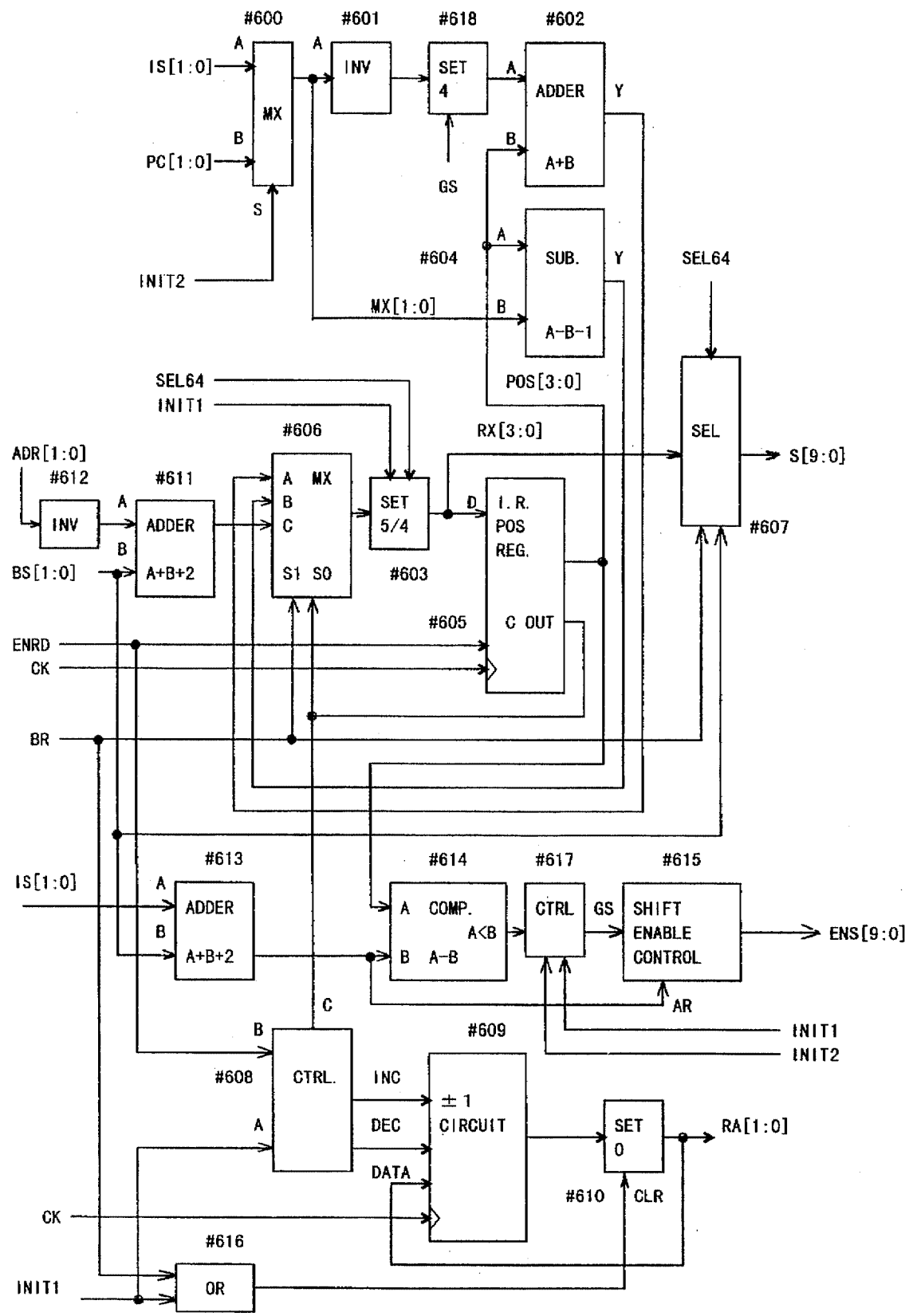
FIG. 6 is a circuit diagram of the shift register control logic, which generates timing signals used by the instruction read shift registers and the address control circuits.

FIG. 6 illustrates the the Shift Register Control (#104) logic. The following table describes the various Input and Output signals.

| | DESCRIPTION |
|---|---|
| INPUT SIGNALS | |
| INIT1, INIT2 | Initial control signals for the shift register |
| IS[1:0] | Instruction Size (e.g. 00=1 byte) |
| PC[1:0] | Two least significant bits of the Program Counter |
| ADR[1:0] | Two least significant bits of instruction memory address during branch |
| BS[1:0] | Next Instruction size |
| BR | HIGH when branch instruction is executed |
| OUTPUT SIGNALS | |
| MX[1:0] | Shift control for IRSR |
| RX[3:0] | IRSR load position for data from instruction memory |
| S[9:0] | Multiplexer select line |
| ENS[9:0] | Fetch signal to read additional bytes needed to construct |

FIG. 9 provides an example of program execution by this invention. The program execution sequence illustrated in FIG. 9 corresponds to the listing given in FIG. 8. The first row in FIG. 9 gives the value of control signals RX[3:0] and the right most column gives the value of RA[[1:0] for every CPU cycle. An "X" in any given Instruction Register position in the table indicates that the register is empty and ready to accept new data.

FIG. 10 gives the state of all control signals during execution of the program found in FIG. 9. A description of the program flow is as follows:

In State 1, it is assumed that new data is present in the PC register as a result of an interrupt or system reset. INIT1 and INIT2 will assume the values shown in FIG. 10 which forces block #603 to set RX[3:0] equal to 5. When RX[3:0] =5 Instruction Registers IR1–IR4 are selected to receive the next word from program memory. Multiplexer select lines S[9:1] are all set equal to 1 as shown in FIG. 10. The Instruction Memory address is 0 at this time because RA[1:0]=0 and the initial PC state is assumed to be 0. The value of RX[3:0] is loaded into the IR Position Register (#605) and RA[1:0] is incremented and stored (#609) at the end of state 1. A truth table of the control logic (#608) operation for the Increment/Decrement block (#609) is given in FIG. 15.

In State 2 of FIG. 9 instructions 1, 2, and part of 3 have been read from Program Memory and loaded into Instruction Registers IR1–IR4. Both INIT bits toggle at this time selecting the two LSBs of the Program Counter to supply MX[1:0] at the output of multiplexer #600. When the PC=0, the Instruction Registers are shifted one position. A one byte shift transfers the contents of IR4–IR1 to 1R3–IR0 respectively. The two LSBs of the Program Counter determine the required shift operation (i.e 00=1 Byte Shift, 01=2 Byte Shift, etc.). The adder (#602) sums the IR Position Register value with the output of inverter blocks (#601) and (#618). In this example the A operand is 3 and the B operand is 5, yielding a sum of 8. An RX[3:0] value of 8 specifies that the next word read from Instruction Memory be loaded into positions IR4–IR7. The load takes place at the end of state 2.

During State 3 and all subsequent states, both INIT bits are held LOW. During State 3, Instruction 1 is executed, giving IS[1:0] a value of 00 since Instruction 1 is a single byte. The IS[1:0] bits are selected to supply MX[1:0] by multiplexer #600. Thus a one byte shift is executed. A new value for RX[3:0] is computed in block #602 resulting in RX[3:0] =11. This value specifies that the next word read from Instruction Memory be loaded into IR7–IR10.

The Instruction Register contents are shifted two positions during State 4 so instruction 2 occupies IR0 and IR1. The Position Register value is added to the Instruction Size yielding an RX[3:0] value of 13. When RX[3:0] is greater than 11, loading of the Instruction register is prohibited. Therefore, no new instruction is read from Instruction memory during this state. At the end of State 4 Control block #608 will ensure that RA[1:0] is decremented.

During State 5 a series of similar operations take place. The Instruction Register contents are shifted 3 positions during State 5 so instruction occupies IR0, IR1, and 12R2. In this case, the Instruction Size value is subtracted from the Position Register yielding a new RX[3:0] value of 10. This specifies that the next word in Instruction Memory be read and loaded into positions IR6–IR9.

The Instruction Register content is shifted 4 positions during State 6 so instruction 4 occupies IR0–1R3. The Position Register value is added to the Instruction Size yielding an RX[3:0] value of 10. This specifies that the next word in Instruction Memory be read and loaded into positions IR6–IR9.

State 7 requires a two byte shift of the Instruction Register that positions Instruction 5 in IR1 and IR0. At this point, Instruction 6 is decoded and identified as a branch instruction by the Branch Instruction Decode logic (#112). The BS signal is set to 1 and BS [1:0] field is set equal to 2 indicating that the next instruction is a 3 byte branch instruction. The Branch Address Generator (#204) examines NIR [31:8] and supplies a branch address of the 102h to Instruction Memory through multiplexer #205.

The Instruction Register content is shifted three positions during State 8 so Instruction 6 occupies IR0–IR3. The branch address is held in register #206 and loaded into the PC (#201) through Multiplexer #208 at the beginning of State 9.

When the next instruction has not been loaded into the Instruction Register in its entirety blocks #613, #614, #615, and #617 execute a read of the remaining instruction bytes. If the sum of the current and the next instruction size is greater than the current position register value, then the GS signal is set to 1. This forces the Set 4 circuit (#618) to generate a 4 as input to adder #602. The adder increments the current IR position by 4 and specifies a new load position for the next word from Instruction Memory. FIGS. 14 and 16 provide the truth tables performed by logic blocks #615 and 617, respectively.

Figure 11:
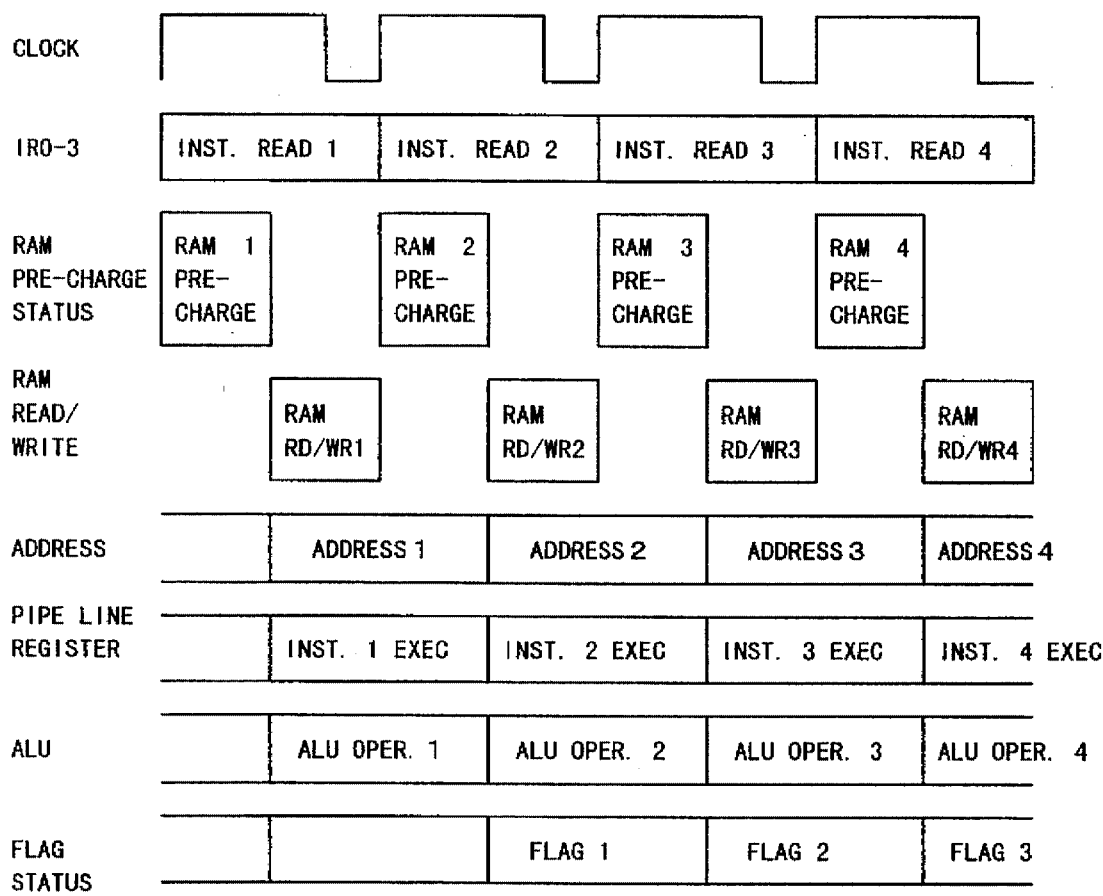
FIG. 11 shows the typical timing of a single-cycle instruction execution.

FIG. 11 illustrates the execution timing of a typical instruction. Immediately after the instruction is read, any RAM addresses specified in the instruction are constructed. Actual reading/writing begins when the Pipeline Register is loaded with the instruction. The general purpose registers are used to store and manipulate data from RAM. The writeback phase of instruction execution occurs after the next instruction is precharged.

Figures 12, 13:
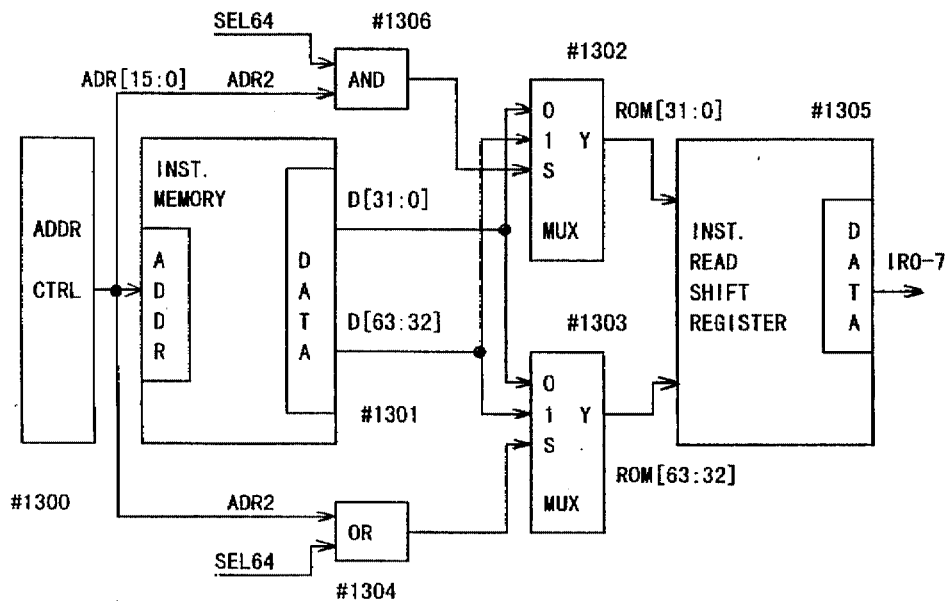
FIG. 12 is the truth table for selection circuit #607.
FIG. 13 is a block diagram demonstrating a technique to scale the architecture described herein to support larger instruction word sizes.

FIG. 13 demonstates how this architecture is expandable to greater instruction word widths with the addtion of two multiplexers; #1302 and #1303. In this example a new instruction is fetched every cycle to ensure that instructions residing in two adjacent memory locations are available for single cycle execution. The instruction memory in FIG. 13 (#1301) is twice the width of memory #102. Multiplexers #1302 & #1303 select between the upper and lower halves of the instruction memory output. Otherwise the Instruction Read Shift Register (#1305) operation is the same as described in FIG. 1.

The select bit for Multiplexers #1302 & #1303 is gated by the internal selection flag SEL64. When SEL64 is set to 1, multiplexer #1303 selects the upper 32 bits from instruction memory while multiplexer #1302 selects the lower 32 bits. The individual Instruction Read Shift Register control bits S7:0 (used to control #106) are set to 1 enabling 64-bit instruction reads. In this situation, the load position is fixed, and all 64 bits are read directly from Instruction Memory to registers IR[0:7].

Figure 17:
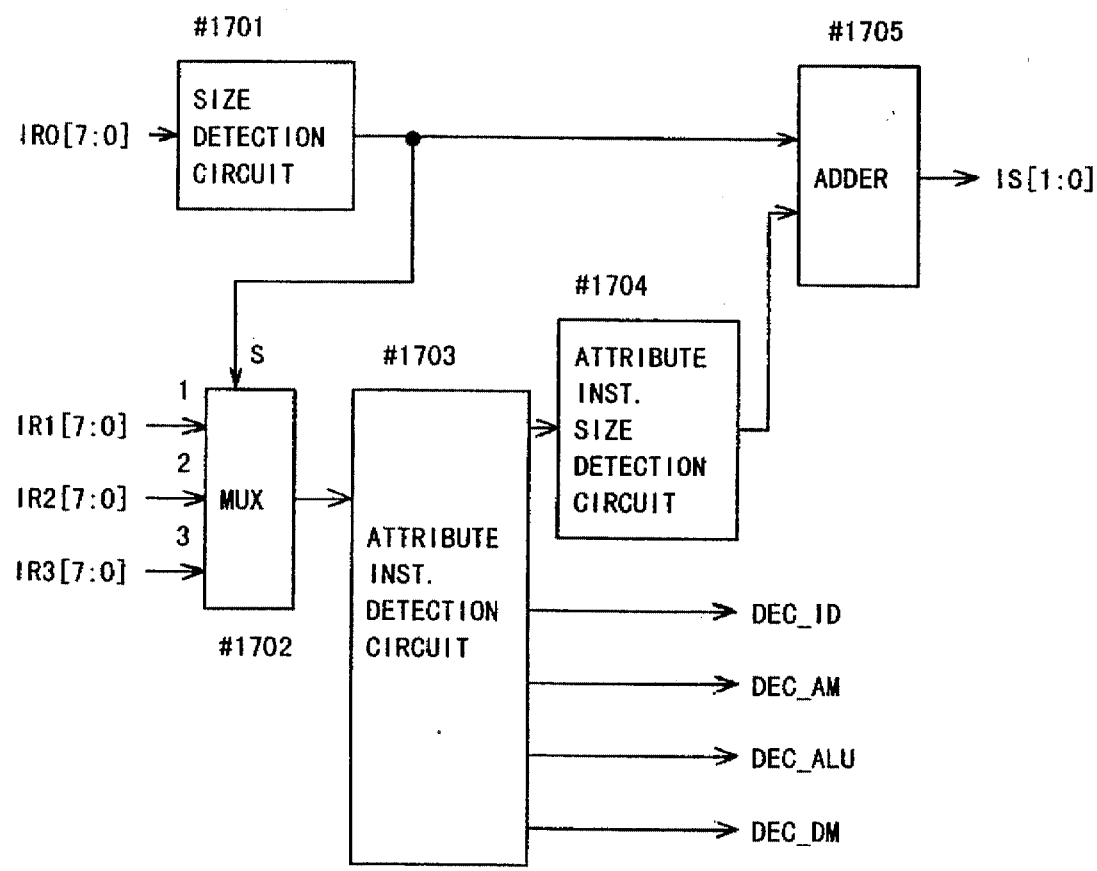
FIG. 17 is a block diagram of the logic used to determine the size of the composite instruction created from the combination of a basic instruction and an attribute.

FIG. 17 is a block diagram of the instruction size generator (#105) in FIG. 1. This logic determines the size of the composite instruction by examining and summing the basic instruction width with the attribute width. The basic instruction size is determined by decoding the Instruction Register field IR[0:7] in block #1701, and generating a two bit code representing the instruction size in bytes. This code is used to select the proper input to multiplexor #1702, which in turn drives the attribute instruction detection circuit (#1703). Block #1703 determines whether or not an attribute is attached to the next instruction. If an attribute instruction is detected in the next instruction then various control signals such as DEC_B, DEC_AM, DEC_ALU, and DEC_DM are generated. For example, DEC_ID indicates that a post-increment or post decrement attribute is present. DEC_AM specifies the addressing range to be 256, 64 Kb, 16 Mb, 4 Gb, etc. Likewise, DEC_DM specifies the data width to be 8, 16, or 32 bits. DEC_ALU selects between various ALU operations such as add, subtract, AND, OR, etc.

The attribute size is then determined in block #1704 and added to the basic instruction size to form the composite instruction size IS[1:0] in block #1705.

Figure 18:
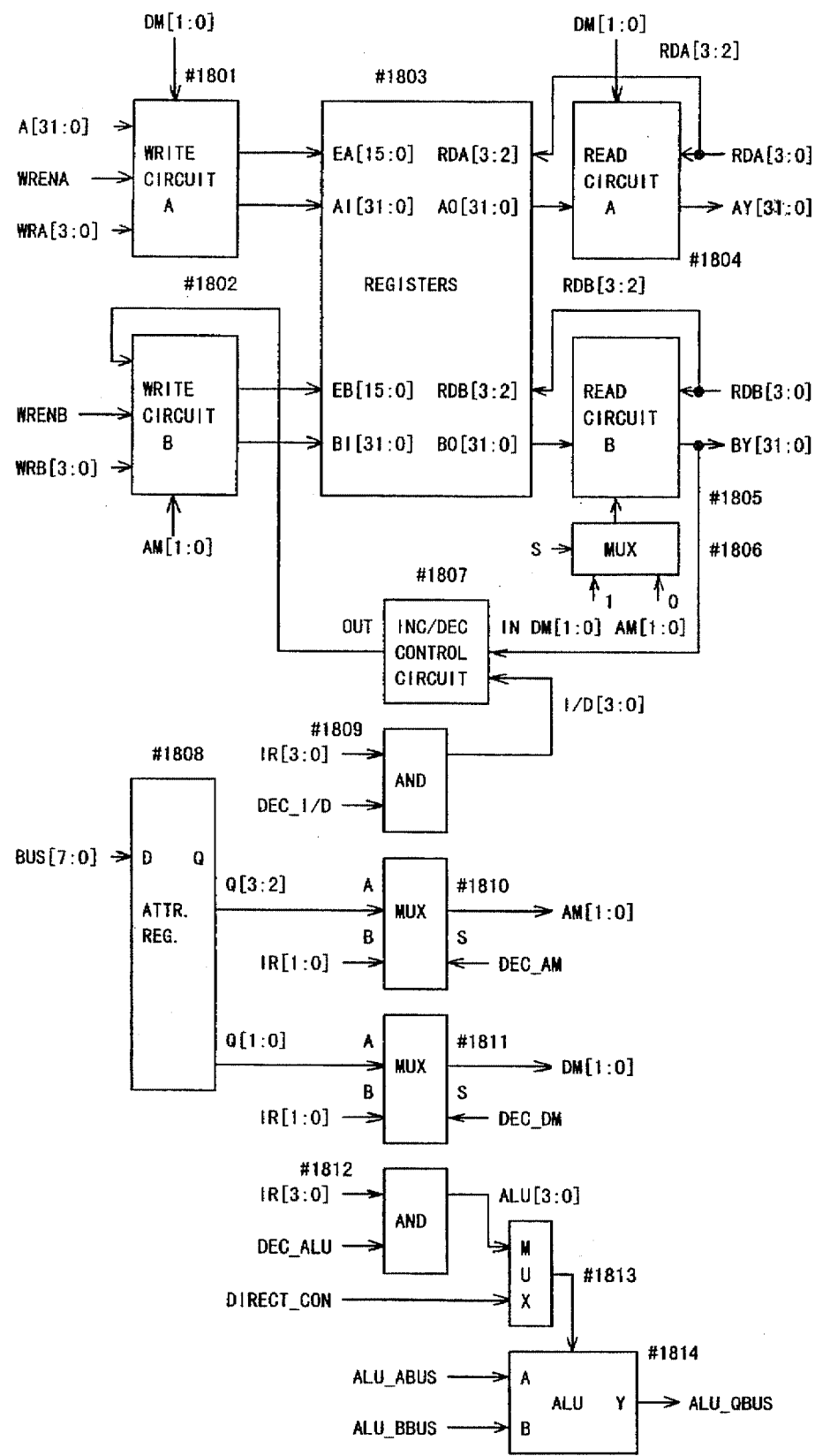
FIG. 18 illustrates the functional block used for register read and write control, the attribute register and ALU control. Register blocks contain two input ports and two output ports controlled by separate addressing schemes.

FIG. 18 is a block diagram of the attribute register, the attribute control circuits, register groups with dual ported input/output control. Default values for the manipulation width and addressing range are held in Q[1:0] and Q[3:2] respectively.

When basic and attribute instructions are combined together to form a single, composite instruction, the state of control signals DEC_ID, DEC_AM, DEC_DM and DEC_ALU will control operation of the circuit. The following table provides a description of the various states of these control bits:

1) Bit width manipulation attribute
   DM[1:0] . . . 00=8 bits, 01=16 bits, 11=32 bits
2) Memory addressing range attribute
   AM[1:0] . . . 00=256 bytes, 01=64 k bytes, 10=16M bytes, 11=4 G bytes
3) Post increment, post decrement attribute
   ID[3:0] . . . XXX1=post increment in source register
   ID[3:0] . . . XX1X=post decrement in source register
   ID[3:0] . . . X1XX=post increment in destination register
   ID[3:0] . . . 1XXX=post decrement in destination register
4) ALU control attribute
   ALU[3:0] . . . selects ALU function (i.e. addition, subtraction, etc.)

Blocks #1809, #1810, #1811, #1812, #1813 generate control signals for surrounding circuitry. The four registers in block #1803 are each 32 bits wide, providing 16 bytes of total storage. Data can be loaded via either of two ports; WRITE CIRCUIT A (#1801) and WRITE CIRUIT B (#1802). The input bus A[31:0] supplies write data from memory or the ALU output when WRENA is active. The destination register address is supplied by the four bit field WRA[3:0] and write data width is specified by DM[1:0]. The minimum word size for a write operation to this register bank is eight bits. Thus 16 register enables EA[15:0] are used to control Register Bank A.

Write circuit B provides the data path for either post increment or post decrement operations in indirect addressing mode. WRENB and WRB[3:0] together specify which registers in Bank B should be written at any given time. Data from the INC/DEC CONTROL CIRCUIT (#1807) is formatted by examining AM[1:0] to select the proper word size. The other data path for loading registers in Bank B is supplied by BI[31:0]. Individual registers are enabled by 16 separate lines labeled EB[15:0]. The Bank A input bus AI[31:0] has priority over BI[31:0] when both banks are to be written simultaneously.

Read circuit A (#1804) is activated when register data is written to KAM, or when data is supplied to the ALU bus (ALU_ABUS) for computation. This circuit also contains a multiplexer to configure data on AY[31:0] to the proper width (8, 16, or 32 bit) and position. RDA[3:0] supplies the register read address in Read Circuit A.

Read Circuit B (#1805) is activated when data is supplied to ALU_BBUS for computation or when an indirect address is specified by this bus. This circuit also contains a multiplexer to configure data on BY[31:0] to the proper width (8, 16, or 32 bit) and position. A multiplexer (#1806) selects between two possible control bit pairs, DM[1:0] and AM[1:0], for Read Circuit B. When DM[1:0] is selected to control Read Circuit B, it will operate exactly like Read Circuit A with data supplied on BY[31:0] serving as a source operand on ALU_BBUS. If on the other hand AM[1:0] is selected to control Read Circuit B then the output represents the proper address range (i.e. 256, 64K, 16M, or 4G).

The indirect address register is incremented and decremented by passing BY[31:0] to the INC/DEC CONTROL CIRCUIT (#1807). Block #1807 is a full 32-bit incrementer/decrementer which feeds WRITE CIRCUIT B (#1802). The output (ALU[3:0]) of the AND circuit (#1812) is multiplexed with data generated by a hardwired control circuit to determine the function of the ALU circuit (#1814).

FIG. 19 is an example of a computer program which includes attribute instructions. This example uses one- and two-byte attributes found in addresses 0003H and address 000AH. FIG. 20 shows the actual instruction memory configuration of the example program given in FIG. 19. Instruction memory is loaded in the exact same manner as described in FIG. 8 with no attributes.

FIG. 21 illustrates the program fetch sequence and instruction register contents during execution of the example program. IR0 shows the current instruction and also holds the instruction size information. For example when instruction 2 is loaded into IR0 as in state 4, the instruction size is determined by #1701 and attribute 1 is immediately selected from IR2 by multiplexer #1702. Circuit #1703 will determine if the current instruction includes an attribute or not. If yes, then the attribute word is attached to the current instruction by modifying the instruction size bits IS[1:0] in adder #1705. The modified instruction size is distributed to various control circuits shown in FIG. 18. State 6 in FIG. 21 illustrates the case of a two-byte attribute.

FIG. 22 is a state table for the major control signals during execution of the example program.

What is claimed is:

1. A system for aligning instructions having varying sizes in a single clock cycle, comprising:

an instruction memory storing a program containing instructions having various widths, an instruction memory width being equal to a maximum instruction width, the instructions being stored contiguously wherein a single instruction may occupy two adjacent locations in said instruction memory;

an instruction shift register for receiving instructions from said instruction memory, storing the instructions and positioning the instructions within said instruction shift register; and an instruction shift register controller coupled to said instruction shift register and said instruction memory for controlling positioning of the instructions in said instruction shift register.

2. The system of claim 1 wherein the instruction memory width is M bits, a minimum instruction width is K bits and said instruction shift register has a minimum width of M*3−K bits.

3. The system of claim 2 wherein said instruction shift register can read an instruction having a width I in a single cycle, where 2*M>I>K.

4. The system of claim 1 further comprising a decoder and a processor, said decoder decoding a next instruction while a current instruction is being executed by said processor.

5. The system of claim 4 wherein said decoder decodes the next instruction when the current instruction is a branch instruction.

6. The system of claim 1 wherein the instructions include low level microcode instructions.

7. The system of claim 6 further comprising:

a processor for executing the basic instruction based on the attribute instruction.

8. The system of claim 1 further comprising an instruction size generator for detecting the presence of an attribute instruction.

9. The system of claim 8 wherein said instruction size generator determines the size of the attribute instruction and outputs a composite instruction size signal based on the size of a basic instruction and the attribute instruction.

10. The system of claim 1 further comprising an additional instruction shift register, wherein the instruction memory width is 2M bits, a minimum instruction width is K bits, and said instruction shift register and said additional instruction shift register each has a minimum width of M*3−K bits.

11. The system of claim 1 further comprising a processor and wherein said instruction memory stores the entire program to be executed by the processor.

12. The system of claim 1 wherein said instruction memory is read only memory.

13. The system of claim 1 wherein instructions in said instruction memory do not change location within said instruction memory.

14. The system of claim 1 wherein said instruction shift register moves instructions in units of bytes.

* * * * *